United States Patent
Nelson et al.

(10) Patent No.: US 8,070,922 B2
(45) Date of Patent: Dec. 6, 2011

(54) MONOLITHIC SUPPORTED OXYGEN GENERATOR

(75) Inventors: David E. Nelson, Independence Township, MI (US); Gerald R. Stabel, Swartz Creek, MI (US); Joshua J. Titus, Laingsburg, MI (US); Alfred R. Webster, Grand Blanc, MI (US)

(73) Assignee: Oxus America, Inc., Rochester Hills, MI (US)

( * ) Notice: Subject to any disclaimer, the term of this patent is extended or adjusted under 35 U.S.C. 154(b) by 1180 days.

(21) Appl. No.: 11/500,050

(22) Filed: Aug. 7, 2006

(65) Prior Publication Data
US 2008/0029406 A1 Feb. 7, 2008

(51) Int. Cl.
*C25B 9/08* (2006.01)

(52) U.S. Cl. ............. 204/266; 96/15; 96/60; 96/70; 96/73; 204/252; 204/253; 204/263; 204/265; 205/629; 205/634; 429/31; 429/33; 429/34; 429/38

(58) Field of Classification Search .......... 96/15, 60, 96/70, 73, 100; 204/252, 253, 263, 265, 204/266; 205/629, 634; 429/31, 33, 34, 429/38
See application file for complete search history.

(56) References Cited

U.S. PATENT DOCUMENTS

| | | | |
|---|---|---|---|
| 5,034,023 A * | 7/1991 | Thompson | ............ 205/634 |
| 5,205,990 A | 4/1993 | Lawless | |
| 5,770,326 A | 6/1998 | Limaye | |
| 5,961,929 A | 10/1999 | Lawless | |
| 5,972,182 A | 10/1999 | Lawless | |
| 6,025,084 A * | 2/2000 | Kawasaki et al. | ............ 429/456 |
| 6,132,573 A | 10/2000 | Cubukcu et al. | |
| 6,194,335 B1 | 2/2001 | Crome et al. | |
| 6,290,757 B1 | 9/2001 | Lawless | |
| 6,541,159 B1 | 4/2003 | Li et al. | |
| 6,744,235 B2 | 6/2004 | Haltiner, Jr. et al. | |
| 6,772,501 B2 | 8/2004 | Barker et al. | |
| 6,835,485 B2 | 12/2004 | Ukai et al. | |
| 2002/0008955 A1 | 1/2002 | Lawless | |

FOREIGN PATENT DOCUMENTS

WO  WO 99/29399  6/1999

OTHER PUBLICATIONS

Lawless, W.N., "Solid-State Generation of Oxygen Using Ceramic Honeycombs", Solid State Ionics 52 (1992), pp. 219-224.
Lawless, W.N., "Honeycomb Fuel Cell", CeramPhysics, Inc., Nov. 17, 2003, pp. 1-10.

* cited by examiner

*Primary Examiner* — Alexa D. Neckel
*Assistant Examiner* — Nicholas A. Smith
(74) *Attorney, Agent, or Firm* — Young Basile Hanlon & MacFarlane, P.C.

(57) ABSTRACT

An oxygen generator includes a monolithic body having first and second channels extending longitudinally therein. An electrode is operatively disposed in the first channels and a counter-electrode is operatively disposed in the second channels. The second channels are formed in the monolithic body so each second channel is electrically isolated from, yet adjacent to a first channel, resulting in an alternating configuration of first and second channels. The first channels have fluid or oxygen flowing therethrough, while the second channels have the other of oxygen or fluid flowing therethrough. An output manifold, having an oxygen collection area separated from a fluid collection area, operatively engages with the monolithic body. The oxygen collection area receives substantially pure oxygen from one of the second or first channels, and the fluid collection area receives oxygen-depleted fluid from the other of the first or second channels.

20 Claims, 5 Drawing Sheets

MONOLITHIC SUPPORTED OXYGEN GENERATOR

BACKGROUND

The present disclosure relates to an oxygen generator, and in particular, to a device for separating oxygen from air.

It is desirable for portable oxygen generators to be relatively quiet, lightweight, and electrically efficient (particularly if they are battery operated), while providing adequate oxygen production capacity. Current oxygen generator designs may fall short in regard to these desirable characteristics. In particular, current portable oxygen generators are often very loud.

Pressurized cylinders and liquid oxygen coolers are often considered the standard for current portable oxygen generators, but devices based on either method are often expensive and require frequent maintenance, such as refilling. Pressure swing absorption (PSA) may be the most frequently used design for oxygen generators. PSA produces relatively high purity oxygen by using a molecular sieve that removes the nitrogen in pressurized air, leaving oxygen and other gases behind. A drawback of the PSA system is that the molecular sieve often becomes saturated with nitrogen after a certain amount of use, thus requiring purging and/or replacement. In attempts to overcome this obstacle and permit relatively continuous operation, multiple sieves have been used in rotation such that, for instance, one sieve is used while another is recharging and a third is re-pressurizing. However, multiple sieves may become relatively costly. Furthermore, compressors used to accelerate gasses through the sieves may be relatively noisy and may require a substantial amount of energy.

Another design for oxygen generators is the generation of oxygen through electrolysis of water. This method may require more electricity than many oxygen generation methods. Additionally, electrolysis generally does not produce large quantities of oxygen at high rates, unless a larger system is used, the size of which may be undesirable.

As such, it would be desirable to provide an oxygen generator design that is capable of relatively high oxygen production while obviating at least some of the drawbacks mentioned above.

SUMMARY

An oxygen generator is disclosed herein. The generator includes a monolithic body having first and second channels extending longitudinally therein. The first channels have an electrode operatively disposed therein, and the second channels have a counter-electrode operatively disposed therein. The second channels are formed in the monolithic body so that each second channel is electrically isolated from, yet adjacent to one of the first channels. This forms an alternating configuration of first channels and second channels. The first channels have fluid or oxygen flowing therethrough, while the second channels have the other of oxygen or fluid flowing therethrough. An output manifold, having an oxygen collection area separated from a fluid collection area, operatively engages with the monolithic body. The oxygen collection area is configured to receive substantially pure oxygen from the second channels or the first channels, and the fluid collection area is configured to receive oxygen-depleted fluid from the other of the first channels or the second channels.

BRIEF DESCRIPTION OF THE DRAWINGS

Objects, features and advantages of embodiments of the present disclosure will become apparent by reference to the following detailed description and drawings, in which like reference numerals correspond to similar, though not necessarily identical components. Reference numerals having a previously described function may not necessarily be described in connection with other drawings in which they appear.

DETAILED DESCRIPTION

Embodiments of the oxygen generator disclosed herein advantageously have a monolithic supported substrate with a through flow design. This monolithic supported ceramic oxygen generator (MSCOG) may be suitable for use as a portable or a stationary oxygen supply system. Embodiments of the system may be used commercially, privately, and/or may be scaled for use industrially. The uniquely efficient structure and dense form factor of the MSCOG design advantageously allows for high volume production of substantially pure oxygen from a small, relatively lightweight generator. Furthermore, the MSCOG may alleviate the need for expensive cylinders, and may replace loud and inefficient portable and/or stationary oxygen generators.

The oxygen generator(s) disclosed herein generally do not require regeneration, and are capable of continually producing substantially pure oxygen that is substantially free of contaminants. Embodiments of the oxygen generators may be smaller, and as efficient, or more efficient than PSA counterparts.

Figure 1:
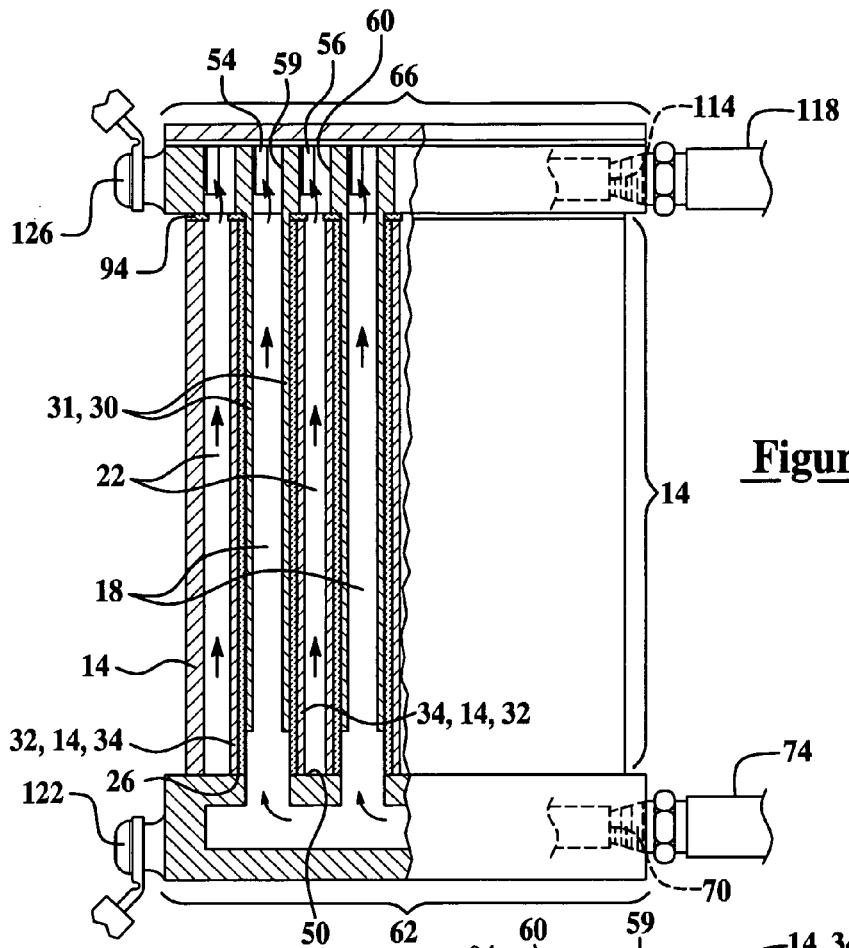
FIG. 1 is a semi-schematic, partially cutaway, cross-sectional side view of an embodiment of an oxygen generator.
Figure 2:
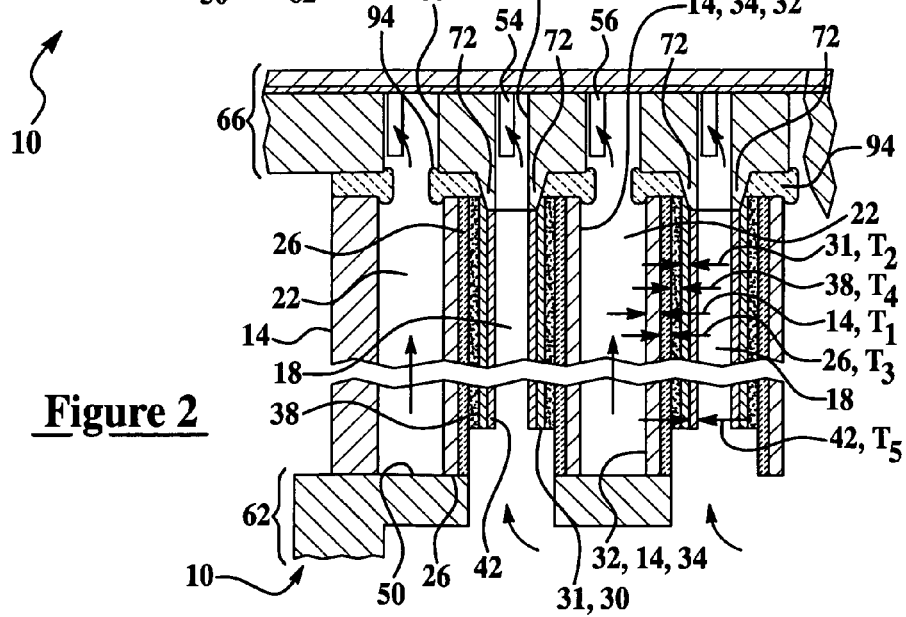
FIG. 2 is an enlarged, semi-schematic, partially cutaway, cross-sectional view of the embodiment of the oxygen generator shown in FIG. 1, but further including interlayers and conductive layers.

Referring now to FIGS. 1 and 2, an embodiment of an oxygen generator 10 includes a monolithic body 14, a plurality of first or electrode channels 18, a plurality of second or counter-electrode channels 22, an electrolyte 26 (separating the electrode 31 and the counter-electrode 32), an input manifold 62, and an output manifold 66. It is to be understood that the first (i.e., electrode) channels 18 have an electrode 31 operatively disposed therein, and the second (i.e., counter-electrode) channels 22 have a counter-electrode 32 operatively disposed therein.

In an embodiment, the electrolyte 26 is a substantially fully dense material that allows the transmission of ions, while the electrode 31, counter-electrode 32, interlayer 38 (shown in FIG. 2), and/or conductive layer(s) 42, (shown in FIG. 2) 42', 42" (shown in FIG. 4) may be porous.

As used herein, the term "electrode" 31 refers to an anode 34 and/or a conductive material layer 42' (shown in FIG. 5) capable of carrying a positive charge, or a cathode 30 and/or a conductive material layer 42" (shown in FIG. 5) capable of carrying a negative charge; and the term "counter-electrode" 32 refers to the other of a cathode 30 and/or a conductive material layer 42", or an anode 34 and/or a conductive material layer 42'. It is to be understood, however, that if the electrode 31 is a cathode 30 and/or a conductive material layer 42", then the counter-electrode 32 is an anode and/or a conductive material layer 42', and vice versa.

As used herein, the monolithic body 14 generally refers to a structure of one substantially continuous body having first and second channels 18, 22 formed therein. The channels 18, 22 form an alternating pattern in the horizontal (e.g., side view) and vertical (e.g., top view) orientations.

The first channels 18 (having the electrode 31 operatively disposed therein) extend longitudinally in the monolithic body 14. It is to be understood that the channels 18 may have any desirable cross-sectional shape, and thus may be formed of any desirable number of walls. Non-limitative examples of the cross-sectional shapes of the first channels 18 include square, triangular, rectangular, circular, hexagonal, any other regular or irregular cross-sectional shapes, or combinations thereof.

For example, in a non-limitative embodiment, each channel 18 may be formed from two pairs of contiguous, longitudinally extending opposed walls, where one of the pairs of opposed walls is angularly offset from the other of the pairs of opposed walls. In another non-limitative embodiment, each channel 18 is formed from three walls, so that the channel 18 has a triangular cross-sectional shape. In embodiments in which the channel 18 is formed of three or more walls, it is to be understood that at least one of the walls is shared by an adjacent second channel 22. It is to be understood that the contiguous longitudinally extending walls may be of any shape, such as, for example, curved, straight, irregular, and/or the like.

The first channels 18 may be adapted to have a fluid, which may be a gas (such as, for example, air or substantially pure oxygen) flowing therethrough. It is to be understood that if the first channels 18 are substantially lined with an anode material layer (reference numeral 34, described further hereinbelow) or a conductive material layer 42' capable of carrying a positive charge, then the channels 18 are adapted to have substantially pure oxygen flow therethrough. It is to be further understood that if the channels 18 are substantially lined with a cathode material layer (reference numeral 30, described further hereinbelow) or a conductive material layer 42" capable of carrying a negative charge, then the channels 18 are adapted to have fluid (e.g., air, oxygen-depleted air, and combinations thereof) flow therethrough.

The second channels 22 are also disposed in the monolithic body 14. Each second channel 22 is directly adjacent to a first channel 18 along each of the longitudinal walls that form channel 22 (except for channels 22 disposed at the outer walls of body 14), thereby forming an alternating, checkerboard-like configuration of the first channels 18 and the second channels 22. The checkerboard-like configuration may best be seen in FIGS. 7 and 8 (discussed further below).

An alternating/checkerboard configuration of the first channels 18 and second channels 22 in the monolithic body 14 may be adapted to permit diffusion of a gas from one or more of the channels 18, 22 to adjacent channels 22, 18. As such, in an embodiment, one or more of the channels 18, 22 may be adapted to permit diffusion through, for example, four walls, since a first channel 18 may be adjacent to four second channels 22, and vice versa.

It is to be understood that the second channels 22 may have any desirable cross-sectional shape, and thus may be formed of any desirable number of walls. Non-limitative examples of suitable cross-sectional shapes and wall configurations are previously described hereinabove. For example, in a non-limitative embodiment, each second channel 22 may be formed from two pairs of contiguous, longitudinally extending opposed walls, where one of the pairs of opposed walls is angularly offset from the other of the pairs of opposed walls. In another non-limitative embodiment, each channel 22 is formed from three walls, so that the channel 22 has a triangular cross-sectional shape.

In an embodiment, the second channels 22 may be adapted to have another fluid flowing therethrough. It is to be understood that the fluid (e.g., air or oxygen) flowing through the second channels 22 is different from the fluid (e.g., the other of oxygen or air) that flows through the first channels 18. For example, if the first channels 18 are adapted to have air flowing therethrough, then the second channels 22 may be adapted to have oxygen flowing therethrough, and vice versa. It is to be understood that if the second channels 22 are substantially lined with an anode material layer (reference numeral 34, described further hereinbelow) or a conductive material layer 42', then the channels 22 are adapted to have substantially pure oxygen flow therethrough. It is to be further understood that if the second channels 22 are substantially lined with a cathode material layer (reference numeral 30, described further hereinbelow) or a conductive material layer 42", then the channels 22 are adapted to have fluid (e.g., air, oxygen-depleted air, and combinations thereof) flow therethrough.

It is to be understood that, with respect to the channels 18, 22, "electrode" 31 and "counter-electrode" 32 may refer to a material which forms the monolithic body 14 in which the channels 18, 22 are formed, and/or may refer to a layer of electrode 31 material or counter-electrode 32 material disposed within (e.g., substantially lining) the channels 18, 22.

In an embodiment, the monolithic body 14 is formed from an anode material (shown in FIGS. 1 and 2), an electrolyte material (shown in FIGS. 3 and 5), a cathode material (shown in FIG. 4), or any other material (non-limitative examples of which include cordierite or other porous substrate materials) suitable for supporting electrode 31 and counter-electrode 32 layers thereon. The monolithic body 14 may be formed by any suitable method such as, for example, by extrusion, stereo lithography, repeated cut/stacked/laminated layer buildup, injection molding, and/or the like, and/or combinations thereof. As non-limitative examples, the anode material may include Ni—YSZ, Ni—$Al_2O_3$, Ni—$TiO_2$, and/or CuO—YSZ, whereby Ni—YSZ may be a preferred anode material.

It is to be understood that an embodiment of the monolithic body 14 may advantageously be formed substantially without machining, without plugs in the channels 18, 22, and/or without internal bus rod connections. It is to be further understood that a monolithic body 14 formed without machining may substantially reduce the possibility for formation of undesirable microcracks in the monolithic body 14 material. Less potential for the formation of microcracks substantially reduces the likelihood that cracks will form, thereby advantageously reducing the potential for leaks between adjacent channels 18, 22.

In the embodiments shown in FIGS. 1 and 2 where the monolithic body 14 is formed from a counter-electrode 32 material (e.g., an anode material layer 34), the plurality of first channels 18 have an electrode 31 material (e.g., cathode material layer 30) established therein. Generally, an electrolyte 26 is established on the anode material layer 34, and the cathode material layer 30 is established on at least a portion of the electrolyte 26 at least a predetermined distance from a surface 50 of an input manifold 62 (described further hereinbelow). The establishment of the cathode material layer 30 substantially ensures its electrical isolation from both the anode material layer 34 and the input manifold 62 (which may be positively charged). In an embodiment, the predetermined distance ranges from about 0.1 inches to about 5 inches, and in another embodiment the predetermined distance is about 1 inch.

The electrode 31 shown in FIG. 1 (e.g., cathode material layer 30) may be established by any suitable method, such as, for example, a slurry coating method, ink coating methods, internal physical vapor deposition (IPVD), and/or laser pyrolysis (LP). Non-limitative examples of the cathode material may include (LaSr)FeCo (LSCF), $LaMnO_3$ (LMO), $LaSrCoO_{3-x}$, $GdCoO_{3-x}$, and/or $SmSrCoO_{3-x}$, and, in an embodiment, LSCF may be a preferred cathode material.

As shown in the embodiment depicted in FIG. 2, the thickness $T_1$ of the monolithic body 14 (i.e., in this embodiment anode material layer 34 or counter-electrode 32) between the first channels 18 and second channels 22 ranges from about 5 microns to about 800 microns, where a thickness $T_1$ equal to or less than about 100 microns may be preferred.

In a non-limitative example embodiment in which the anode material layer 34 functions as the monolithic body 14, the thickness $T_1$ of the monolithic body 14 may range from about 50 microns to about 500 microns; or alternately, from about 80 microns to about 250 microns. In an alternate non-limitative example embodiment in which the electrolyte 26 functions as the monolithic body 14 (shown in FIGS. 3 and 4), the thickness $T_1$ of the monolithic body 14 may range from about 20 microns to about 500 microns; or alternately, from about 50 microns to about 150 microns. In still a further alternate non-limitative example embodiment in which a conductive material layer 42', 42" functions as the monolithic body 14, the thickness $T_1$ of the monolithic body 14 may range from about 50 microns to about 500 microns; or alternately, from about 80 microns to about 250 microns. In yet a further alternate non-limitative example embodiment in which the cathode material layer 30 functions as the monolithic body 14, the thickness $T_1$ of the monolithic body 14 may range from about 50 microns to about 500 microns; or alternately, from about 80 microns to about 250 microns.

The electrode 31 or counter-electrode 32 (e.g., cathode material layer 30 shown in FIGS. 1, 2 and 3) may have a thickness $T_2$ ranging from about 5 microns to about 500 microns. In an embodiment in which the material forming the electrode 31/counter-electrode 32 does not function as the monolithic body 14, an electrode 31 or counter-electrode 32 (e.g., cathode material layer 30) thickness $T_2$ less than about 50 microns may be preferred; or alternately, from about 5 microns to about 35 microns.

As depicted in FIGS. 1 and 2, the electrolyte 26 extends between each of the adjacent first channels 18 and second channels 22. More specifically, an electrolyte 26 extends between the anode material layer 34 (or counter-electrode 32) and the cathode material layer 30 (or electrode 31). The electrolyte 26 may be formed from any suitable material. Non-limitative examples of the electrolyte 26 may include yttria stabilized zirconia, gadolinia-doped ceria, samaria-doped ceria, scandia-doped zirconia, ytterbia-doped zirconia, samarium oxide-doped ceria, gadolinium oxide-doped ceria, and combinations thereof. In an embodiment, the electrolyte 26 is formed from yttria stabilized zirconia. The thickness $T_3$ of the electrolyte 26 may range from about 2 microns to about 500 microns. In a non-limitative example embodiment, the electrolyte 26 has a thickness $T_3$ less than about 10 microns.

The electrolyte 26 may be established on the anode material layer(s) 34 (or cathode material layer 30, shown in FIG. 5) by any suitable method, such as, for example, a slurry coating method, internal physical vapor deposition (IPVD), ink coating methods, and/or laser pyrolysis (LP).

As depicted in FIG. 2, the oxygen generator 10 may also include an interlayer 38 disposed substantially between the electrolyte 26 and the electrode 31 (e.g., cathode material layer 30). The interlayer 38 has a thickness $T_4$ ranging from about 2 microns to about 20 microns. In an embodiment, the interlayer 38 thickness $T_4$ is less than about 6 microns. As non-limitative examples, the interlayer 38 may be formed from $(CeSm)O_{2-x}$ and/or strontium doped lanthanum manganate (LSM). In an embodiment, an interlayer 38 formed from $(CeSm)O_{2-x}$ may be preferred.

In an embodiment in which the interlayer 38 is coupled with a conductive layer 42, 42', 42", it is to be understood that the interlayer 38 may function as a cathode.

The oxygen generator 10 may also include a conductive layer 42 (shown in FIG. 2) established substantially along the length of the electrode 31 (e.g., cathode material layer 30) or the counter-electrode 32. The conductive layer 42 may substantially enhance electric current flow throughout the first channels 18 (or second channels 22, depending on where the cathode material layer 30 is established) of the oxygen generator 10. Non-limitative examples of the conductive layer 42 include silver, palladium, platinum, ferritic stainless steel, copper, and/or combinations thereof. In an embodiment, the conductive layer 42 generally has a thickness $T_5$ ranging from about 20 microns to about 100 microns.

In an embodiment including the conductive layer 42 and/or interlayer 38, it is to be understood that such layers extend substantially the length of the electrode 31 (e.g., cathode material layer 30). As such, the conductive layer 42 and/or interlayer 38 are established a predetermined distance (e.g., between about 0.1 inches and about 5 inches) from the surface 50 of the input manifold 62. The oxygen generator 10 may also include an input manifold 62 and an output manifold 66. The input manifold 62 may be operatively engaged with the monolithic body 14 to direct fluid, such as, for example, air, through either the plurality of first channels 18 or the plurality of second channels 22 (i.e., whichever channels 18, 22 have the cathode material layer(s) 30 and/or the conductive material layer(s) 42" established therein).

The output manifold 66 may be operatively engaged with the monolithic body 14 at an area opposed to the input manifold 62. The output manifold 66 includes a fluid collection area 54 which receives fluid, such as, for example, air depleted of oxygen, from either the plurality of first channels 18 or the plurality of second channels 22 (whichever channels 18, 22 are substantially lined with cathode material layer(s) 30 and/or the conductive material layer(s) 42"). The output manifold 66 also includes an oxygen collection area 56 which receives substantially pure oxygen from the other of the plurality of counter-electrode channels 22 or the plurality of electrode channels 18 (whichever channels 22, 18 are substantially lined with anode material layer(s) 34 and/or the conductive material layer(s) 42'). The fluid collection area 54 and the oxygen collection area 56 are separated from each other so that the substantially pure oxygen may be collected without contacting the fluid. The output manifold 66 will be described in more detail in reference to FIGS. 6 and 7.

In an embodiment for generating substantially pure oxygen using the oxygen generator 10, air enters the input manifold 62 through a first aperture 70. The air may be directed to the first aperture 70 via an inlet pipe 74 that is in fluid contact therewith. It is to be understood that the fluid may, in some embodiments, be pressurized as it enters the input manifold 62. Pressurized fluid at the first aperture 70 may substantially increase oxygen production rates. In the embodiments of FIGS. 1 and 2, the input manifold 62 is contact brazed to the monolithic body 14 such that any fluid passing through the input manifold 62 is directed/piped through the first channels 18 (which are substantially lined with the cathode material layer(s) 30) and is restricted from the second channels 22. It is to be understood that in another embodiment, the input manifold 62 may be aligned with and/or affixed to the monolithic body 14 such that fluid passing through the input manifold 62 is piped through the second channels 22 (having the cathode material layer(s) 30 and/or the conductive material layer(s) 42" established therein) and is restricted from the first channels 18.

It is to be further understood that the input manifold 62 and/or output manifold 66 may be engaged with the monolithic body 14 by any suitable means, including, but not limited to contact brazing. Another non-limitative example of engaging the input manifold 62 and/or output manifold 66 includes contouring the respective manifold 62, 66 so that the monolithic body 14 at least partially sits within the manifold 62, 66 edges. Still another non-limitative example of engaging the input manifold 62 and/or the output manifold 66 with the monolithic body 14 includes constraining the monolithic body 14 between the manifolds 62, 66 using tensioning bolts on the corners or edges of the manifolds 62, 66. This compresses the monolithic body 14 between each of the manifolds 62, 66 and the respective tensioning bolts.

Embodiment(s) of the oxygen generator 10 may further include a bus system operatively engaged with the oxygen generator 10, the bus system configured to deliver and/or collect electrical current to/from the oxygen generator 10. It is contemplated as being within the purview of the present disclosure that any suitable bus system may be used, as desired. In an embodiment, the input manifold 62 and output manifold 66 are operatively configured to act as the bus system. For example, the output manifold 66 may be configured to collect current from one of: the electrodes 31; or the counter-electrodes 32. Further, the input manifold 62 may be configured to deliver current to the other of: the counter-electrodes 32; or the electrodes 31.

Figure 4:
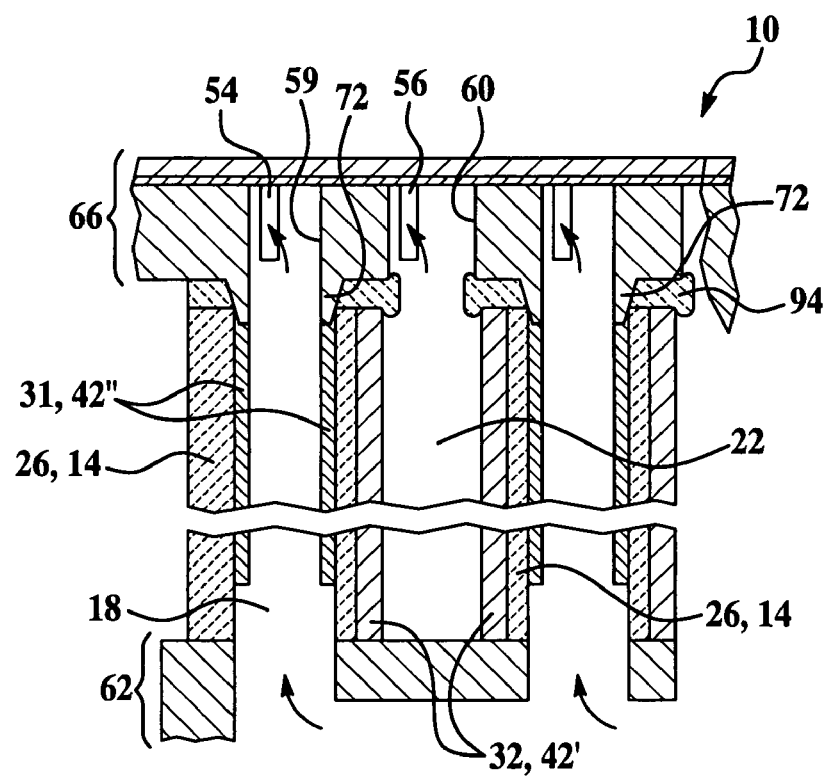
FIG. 4 is a semi-schematic, partially cutaway, cross-sectional view of another alternate embodiment of an oxygen generator.

Generally, the input manifold 62 and output manifold 66 have respective terminals 122, 126, which transmit, apply and/or maintain a charge to/on the respective manifolds 62, 66. In an embodiment, the output manifold 66 has a negative terminal 126, which transmits a negative charge to the output manifold 66. The negative charge is maintained on the output manifold 66, and is also transferred to the cathode material layer(s) 30 (and/or the conductive material layer 42", as shown in FIG. 4) via contact surfaces 72 on the output manifold 62 (also seen in FIGS. 4, 5 and 7). The negative charge is not transferred to the input manifold 62, at least in part, because of the electrolyte 26 and the predetermined distance between the cathode material layer(s) 30 (and/or conductive layer(s) 42 and/or conductive layer(s) 42", if present) and the input manifold 62, as previously described. This type of output manifold 66 may also be referred to as a cathode manifold. Furthermore, a glass seal 94 (described further below) is positioned between the output manifold 66 and the monolithic body 14 (and the anode material layer(s) 34) to keep the negative charge from flowing into the monolithic body 14.

The input manifold 62 generally has a positive terminal 122, which transmits a positive charge to the input manifold 62. A positively charged input manifold 62 attracts electrons that are given off when oxygen is formed. Generally, the electrons travel through the second channels 22 (or first channels 18 if lined with anode material layer(s) 34 and/or conductive material layer(s) 42') to the input manifold 62 and into the positive terminal 122.

In this embodiment, the negative charge through the cathode material layer(s) 30 initiates catalysis in the first channels 18. Catalysis results in the formation of oxygen ions. The oppositely charged manifolds 62, 66 induce the generated oxygen ions to diffuse through the electrolyte 26 from the first channels 18 (i.e., those channels 18, 22 lined with cathode material layer(s) 30 or conductive material layer(s) 42") to the second channels 22 (i.e., those channels 22, 18 lined with anode material layer(s) 34 or conductive material layer(s) 42'). As previously described, the electrons are then drawn towards the positive input manifold 62, leaving substantially pure oxygen in the second channels 22.

Figure 6:
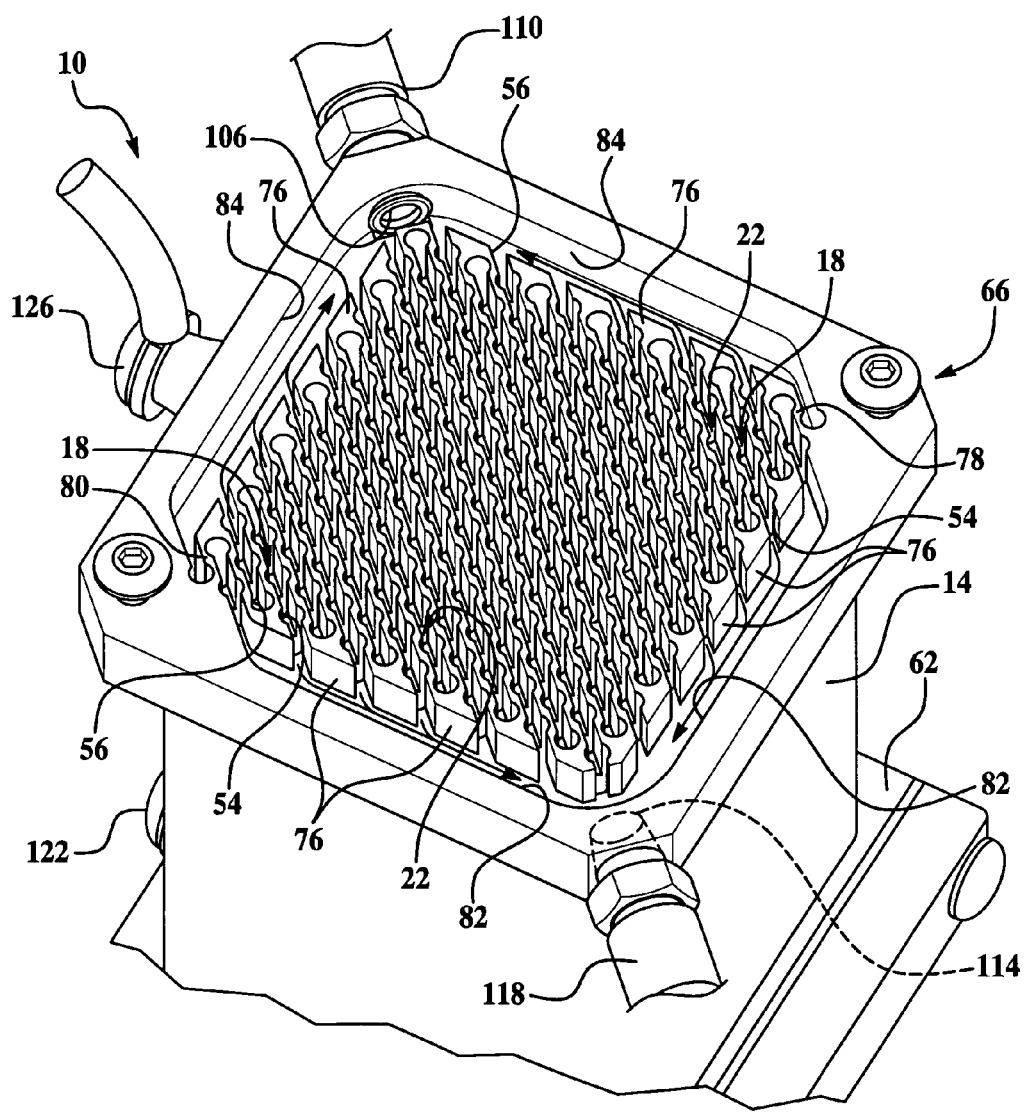
FIG. 6 is a semi-schematic, top perspective view of an embodiment of an oxygen generator with a manifold cap removed to show an embodiment of the internal geometry of an output manifold.

Referring now to FIGS. 1, 2 and 6 together, the oxygen may then be directed out of the second channels 22 into respective fluidly connected oxygen collection areas 56; and the oxygen depleted fluid (e.g. oxygen depleted air) remaining in the first channels 18 may be directed out of the first channels 18 into respective fluidly connected fluid collection areas 54. It is to be understood that the oxygen and oxygen-depleted fluid may be pumped out of, or may flow out of the respective channels 18, 22 naturally. As depicted in FIGS. 1, 2 and 6, the areas 54, 56 are continuously separated so the purified oxygen remains out of contact with the oxygen-depleted fluid.

As depicted in FIG. 6, the output manifold 66 includes a plurality of the oxygen collection areas 56, and a plurality of the fluid collection areas 54. As shown, each of the oxygen collection areas 56 funnels the collected oxygen into oxygen collection channels 84, which collect and direct the oxygen out of the oxygen generator 10 via the oxygen outlet 106. Likewise, the exhaust air (i.e., oxygen-depleted fluid) is funneled, via the fluid collection areas 54, to exhaust collection channels 82, which collect and direct the oxygen-depleted fluid out of the oxygen generator 10 via the exhaust outlet 114.

In an embodiment, each of the plurality of areas 54, 56 extends substantially parallel to each of the other of the areas 54, 56 throughout the output manifold 66. It is to be understood that each of the oxygen collection areas 56 is configured to receive oxygen from some of second channels 22, for example, through openings 60 (shown in FIGS. 1 through 4) of the second channels 22 substantially directly in fluid communication with the oxygen collection areas 56. It is to be further understood that each of the fluid collection areas 54 is configured to receive oxygen-depleted fluid (e.g., oxygen-depleted exhaust air) from some of the first channels 18, for example, through openings 59 of the first channels 18 substantially directly in fluid communication with the fluid collection areas 54.

FIG. 6 also depicts a substantially serpentine wall 76 having a first end 78 and a second end 80 located in the output manifold 66. The serpentine wall 76 is substantially continuous throughout the manifold 66. As shown, the serpentine wall 76 alternately forms the plurality of the oxygen collection areas 56 and the plurality of the fluid collection areas 54 between adjacent wall sections thereof. In an embodiment, the serpentine wall 76 is established in the output manifold 66 so that each of the plurality of the oxygen collection areas 56 and the plurality of the fluid collection areas 54 extends substantially angularly offset (e.g., diagonally) with respect to one of the respective oxygen collection channel(s) 84 and exhaust collection channel(s) 82. Each of the plurality of the oxygen collection areas 56 has a flow path of a first direction, and each of the plurality of fluid collection areas 54 has a flow path of a second direction. It is to be understood that the first direction may advantageously be substantially the same as, substantially opposite from, or angularly (any desired angle) offset from the second direction. In the non-limitative embodiment shown in FIG. 6, the first direction (the flow path within oxygen collection areas 56) is substantially parallel to, yet substantially opposite from the second direction (the flow path within fluid collection areas 54). It is to be understood that the respective collection areas 54, 56 may be configured in any suitable manner so as to render the first and second directions in any desired orientation relative to one another (e.g. in generally the same direction, in a perpendicular orientation, and/or any other orientation). Further, it is to be understood that the first direction flow path (within oxygen collection areas 56) may be in the same or a different plane than that of the second direction flow path (within fluid collection areas 54). For example, the flow paths of the first and second directions are shown in the same plane in FIG. 6; however, first direction flow path may be in a plane above second direction flow path, etc.

In an embodiment, the input manifold 62 is adapted to provide a substantially uninterrupted fluid flow along the length of the plurality of first channels 18 and/or the plurality of second channels 22. As a non-limiting example, the input manifold 62 may direct air into the first channels 18 in a direction substantially parallel to the direction that the air and oxygen pass through the channels 18, 22 and, respectively, exit the first channels 18 and second channels 22 and enter the output manifold 66. It is to be understood that a substantially uninterrupted fluid flow may substantially prevent dead ended fluid flow and/or reaction starvation, which may cause reduced oxygen generation along an electrode and/or counter-electrode channel 18, 22.

Figure 3:
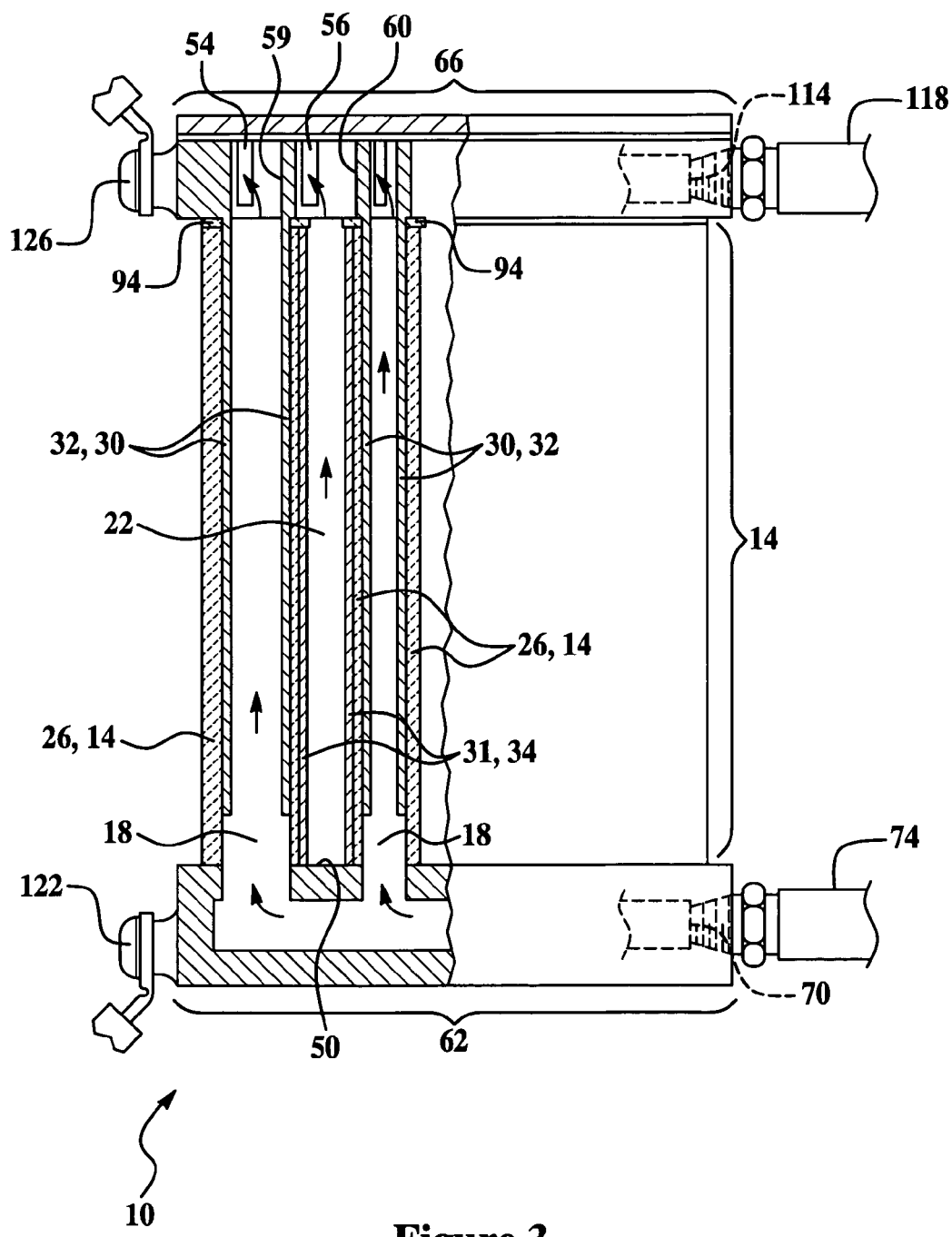
FIG. 3 is a semi-schematic, partially cutaway, cross-sectional side view of an alternate embodiment of an oxygen generator.

FIG. 3 depicts an alternate embodiment of the oxygen concentrator 10 having a monolithic body 14 formed of an electrolyte 26 material. In this embodiment, the monolithic body 14 may directly contact the surface 50 of the input manifold 62, substantially without risk of shorting the generator 10.

As the monolithic body 14 in this embodiment is formed of electrolyte 26, an electrode 31 and a counter-electrode 32 are established in the respective channels 22, 18. In the non-limitative example depicted in FIG. 3, an anode material layer 34 (i.e., electrode 31) is established substantially along the length of the electrolyte 26 in the first channels 18 or the second channels 22. In the other of the second channels 22 and the first channels 18, a cathode material layer 30 (i.e., counter-electrode 32) is established along a portion of the electrolyte 26, as previously described. As a non-limitative example, FIG. 3 depicts the anode material layer(s) 34 established along the electrolyte 26 surrounding the second channels 22, and the cathode material layer(s) 30 are established along the electrolyte 26 surrounding the first channels 18. As previously described, air is initially directed to those channels 18, 22 having the cathode material layer(s) 30 (or the conductive material layer(s) 42", shown in FIG. 4) therein.

In this embodiment, the anode material layer 34 and/or the cathode material layer 30 may be established by any suitable method, such as, for example, a slurry coating method, ink coating methods, internal physical vapor deposition (IPVD), and/or laser pyrolysis (LP).

An output manifold 66, as previously described, is included in the embodiment of the oxygen concentrator 10 of FIG. 3. The manifold 66 has separated fluid collection areas 54 and oxygen collection areas 56 that are fluidly connected to the appropriate one of first channels 18 or second channels 22 (depending on which channels 18, 22 have oxygen flowing therethrough).

FIG. 4 depicts an alternate embodiment of the oxygen concentrator 10 having a monolithic body 14 formed of an electrolyte 26 material. In this embodiment, conductive material layers 42", 42' are operatively disposed in respective channels 18, 22. It is to be understood that one of the conductive material layers 42" is configured to act as an electrode 31, and the other conductive material layer 42' is configured to act as a counter-electrode 32. In this embodiment, each of the conductive layer(s) 42', 42" generally has a thickness ranging from about 5 microns to about 100 microns.

It is to be understood that at least one of the conductive layers 42', 42" (shown as electrode 31 in FIG. 4) may be catalytic, and is capable of facilitating oxygen ion transfer through the electrolyte 26. Suitable catalytic conductive materials include, but are not limited to, silver, palladium, platinum, copper, alloys thereof, and/or combinations thereof. In a non-limitative example, the conductive layers 42', 42" are formed of silver palladium.

As depicted in FIG. 4, the first channel 18 has the conductive material layer 42" operatively disposed therein. The negative charge from the output manifold 66 is transferred to the conductive layer 42" via contact surfaces 72 on the output manifold 66. The negative charge through the conductive material layer 42" initiates catalysis in the first channels 18. Catalysis results in the formation of oxygen ions. The oppositely charged manifolds 62, 66 induce the generated oxygen ions to diffuse through the electrolyte 26 from the first channels 18 (i.e. those channels 18, 22 lined with cathode material layer(s) 30 or conductive material layer 42") to the second channels 22 (i.e., those channels 22, 18 lined with anode material layer(s) 34 or conductive material layer 42'). As previously described, the electrons are then drawn towards the positive input manifold 62, leaving substantially pure oxygen in the second channels 22 to be collected in the oxygen collection areas 54.

In this embodiment, a glass seal 94 may be incorporated to keep the negative charge from flowing into the other conductive layer 42'. Alternately, conductive layer 42' may be terminated prior to contacting the output manifold 66, thereby keeping negative charge from flowing therethrough.

Figure 5:
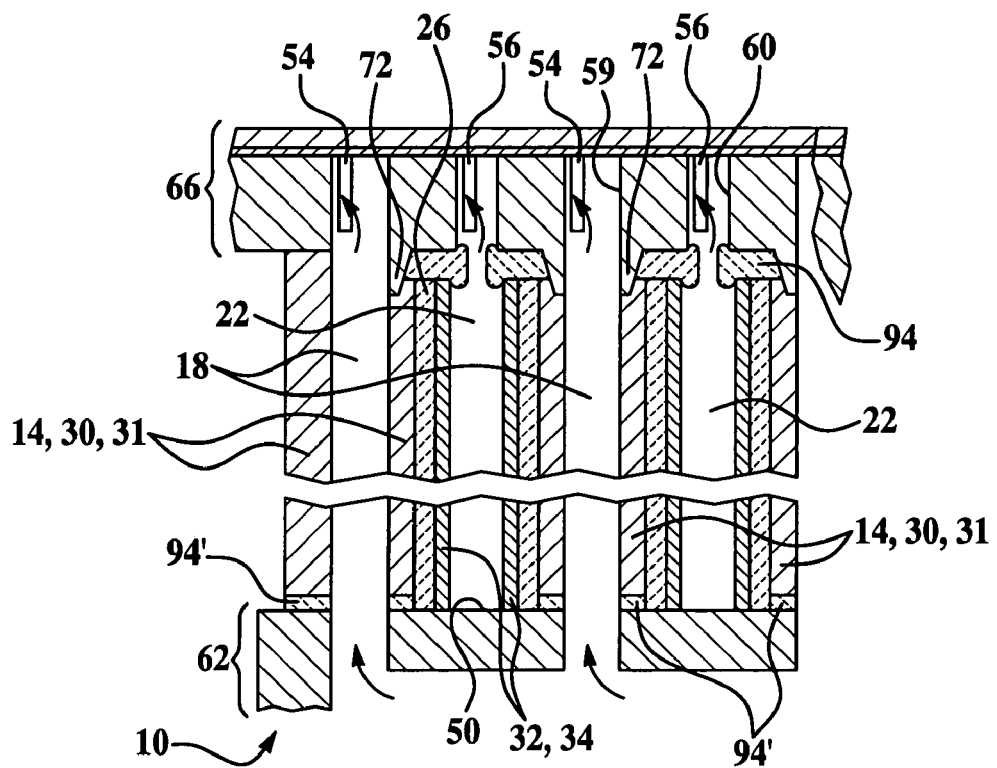
FIG. 5 is a semi-schematic, partially cutaway, cross-sectional view of still another alternate embodiment of an oxygen generator.

Referring now to FIG. 5, another alternate embodiment of the oxygen generator 10 is depicted. In this embodiment, an electrode 31 material (e.g., a cathode material layer 30) forms the monolithic body 14, and the second channels 22 have a counter-electrode 32 material (e.g., anode material layer 34) established therein. Generally, an electrolyte 26 extends between the electrode 31 (e.g., cathode material layer 30) and the counter-electrode 32 (e.g., anode material layer 34).

This embodiment also includes a second glass seal 94', which electrically isolates the monolithic body 14 (e.g., cathode material layer 30) from the input manifold 62. In an alternate embodiment, the electrolyte 26 may be established so that the manifold body 14 (e.g., cathode material layer 30) is electrically isolated from portions of the input manifold 62.

In this embodiment, the counter-electrode 32 (e.g., anode material layer 34) may be established by any suitable method, such as, for example, a slurry coating method, ink coating methods, internal physical vapor deposition (IPVD), and/or laser pyrolysis (LP). Furthermore, the embodiment shown in FIG. 5 may also include conductive layer(s) 42 and/or interlayer(s) 38 established similarly to those shown in FIG. 2.

It is to be understood that oxygen is formed substantially in the same manner as previously described, e.g., via the initiation of catalysis in the channels 18 having cathode material layer(s) 30 operatively disposed therein.

In any of the anode 34/cathode 30/electrolyte 26 deposition processes discussed herein, it is to be understood that, if desired, either of channels 18, 22 may be masked off or sealed (by any suitable means) when it is desired to establish one of the above layers in the other of channels 22, 18. After such establishment, the mask may be removed, and the other of channels 22, 18 may then be masked before operatively establishing a respective one of the above layers in channels 18, 22.

Furthermore, in any of the embodiments disclosed herein where electrical contact between the monolithic body 14 and the input manifold 62 is desired, a conductive glass seal (not shown) may be established therebetween. Non-limitative examples of materials suitable for a conductive glass seal include glass-silver pastes, glass-carbon pastes, glass-copper pastes, or the like, or combinations thereof.

It is to be understood that in any of the embodiments disclosed herein, the electrode 31 and/or the counter-electrode 32 may extend substantially the length of the monolithic body 14, and/or may extend substantially shorter than the length of the monolithic body 14. In one embodiment, the electrode 31 and counter-electrode 32 may extend shorter than the length of the monolithic body 14 so that each terminates prior to reaching the respective manifolds 62, 66. Such configurations may include some means (e.g., conductive layer(s) 42, 42', 42") for transmitting negative charge or positive charge to the respective electrode 31 or counter-electrode 32 for initiating catalysis and transmitting generated electrons.

Referring again to FIG. 6, a top perspective view of an embodiment of an oxygen generator 10 with an output manifold 66 cap removed is shown. As previously described, FIG. 6 depicts an embodiment of the internal geometry of the output manifold 66, including a plurality of fluid collection areas 54, and oxygen collection areas 56 disposed in an alternating arrangement, separated via the previously described serpentine wall 76. Each fluid collection area 54 has an end opening into the exhaust collection channel 82 (two of which are shown in FIG. 6), and each oxygen collection area 56 has an end opening into oxygen collection channels 84 (two of which are shown in FIG. 6). It is to be understood that the channels 82, 84 also remain separate so that the oxygen and oxygen-depleted fluid do not contact each other.

It is to be further understood that each of the first channels 18 or the second channels 22 is in fluid communication with the plurality of oxygen collection areas 56, while the other of the second channels 22 or first channels 18 is in fluid communication with the plurality of fluid collection areas 54. The oxygen collection areas 56 and channels 84, and the fluid collection areas 54 and exhaust collection channels 82 may be formed by any suitable means such as, for example, machining, casting, forging/stamping, injection molding, or the like, or combinations thereof.

As previously described, the oxygen collected in each of the oxygen collection areas 56 may flow into a common stream via the oxygen collection channel 84. Likewise, the fluid collected in the fluid collection areas 54 may flow into another common stream via exhaust collection channels 82. For example, as depicted in FIG. 6, any fluid passing through the oxygen collection areas 56 flows into one of the two oxygen collection channels 84, which combine the oxygen streams at the oxygen outlet 106. The flowing oxygen exits the output manifold 66 via the oxygen removal pipe 110. As a further example, as depicted in FIG. 6, any fluid passing through each of the fluid collection areas 54 flows into one of the two exhaust collection channels 82, which combine the fluid at the exhaust outlet 114. The flowing fluid exits the output manifold 66 via the exhaust removal pipe 118. In another embodiment, the exhaust removal pipe 118 is removed, and the exhaust outlet 114 may, depending on the surrounding conditions, direct fluid to the ambient environment. Furthermore, it is to be understood that the oxygen removal pipe 110 may include any suitable means for harnessing the oxygen generated within the oxygen generator 10. Further, it is to be understood that generator 10 may be directly connected to any suitable oxygen harnessing device via suitable couplings, with or without pipe 110 therebetween. It is to be further understood that fluid (e.g., oxygen, oxygen-depleted fluid) may naturally flow, or be pumped through the oxygen outlet 106 and/or the exhaust outlet 114.

The oxygen collection areas 56 and fluid collection areas 54 may have an inclined design whereby a cross-section of each area 54, 56 becomes larger in a direction of substantial fluid flow within the area 54, 56. A non-limitative example of a direction of substantial fluid flow within the areas 54, 56 is through the area 54, 56 in a direction toward the respective channels 82, 84 and ultimately the respective outlets 106, 114. Such an inclined output manifold 66 design may be adapted to substantially equalize fluid flow rates within the manifold 66.

In the embodiment shown in FIG. 6, fluid from the first channels 18 and the second channels 22 may flow from the channels 18, 22 into the output manifold 66 in a substantially uninterrupted manner, such that the direction of fluid flow is not significantly altered. It is to be understood, however, that the direction of fluid flow within the output manifold 66 may change while substantially uninterrupted flow from each channel 18, 22 into the manifold 66 is maintained. As used herein, the term "substantially uninterrupted flow" may refer to substantially non-turbulent or substantially non-stop fluid flow.

In an alternate embodiment, fluid may also flow in the reverse direction through the exhaust outlet 114, along channels 82 and areas 54, and down channels 18. This flow may be substantially constant, or may pulse back and forth. It is to be understood, however, that such pulsing back and forth of the fluid may, in some instances, be less efficient than a substantially constant directional flow design.

Figure 7:
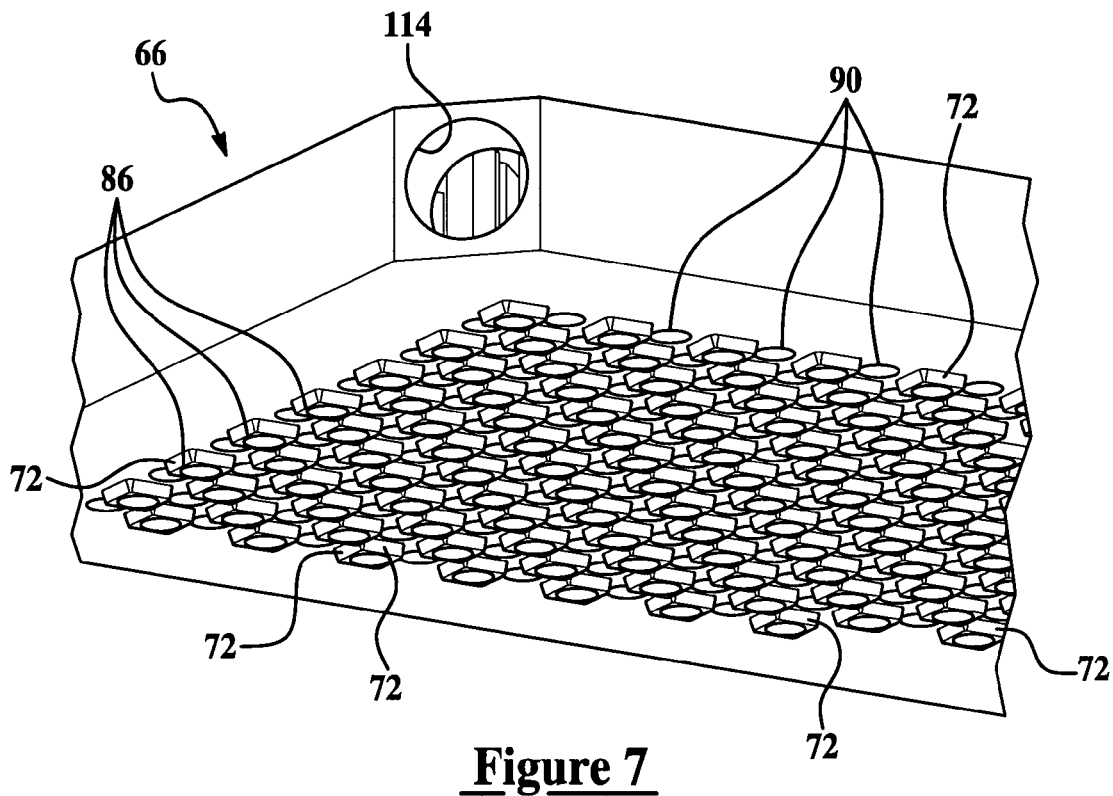
FIG. 7 is a semi-schematic, cutaway, bottom perspective view of an embodiment of an output manifold adapted for operative engagement with a glass seal.

Referring now to FIG. 7, the output manifold 66 may have one or more ports 86, 90 for receiving one or more fluids from the channels 18, 22 within the monolithic body 14. The second manifold 66 has a plurality of first ports 86, adapted to receive fluid from the first channels 18, and a plurality of second ports 90, adapted to receive fluid from the second channels 22.

The output manifold 66 may be sealed and/or electrically isolated from the anode material layer 34 by one or more glass, glass-ceramic oxide composite, and/or glass fiber material seals 94 (mentioned above), an embodiment of which is shown in FIG. 8. The embodiment of a glass/glass-ceramic oxide/glass fiber seal 94 depicted in FIG. 8 includes a plurality of first apertures 98, adapted to substantially align with the first channels 18 and the first ports 86. Glass seal 94 further includes a plurality of second apertures 102, adapted to substantially align with the second channels 22 and the second ports 90. It is to be understood that any number of seals 94 may be used in combination in the generator 10. It is to be further understood that the seal(s) 94 and/or the monolithic body 14 may be adapted to channel fluids, isolate electric charge, and/or channel electric current flow.

Figure 8:
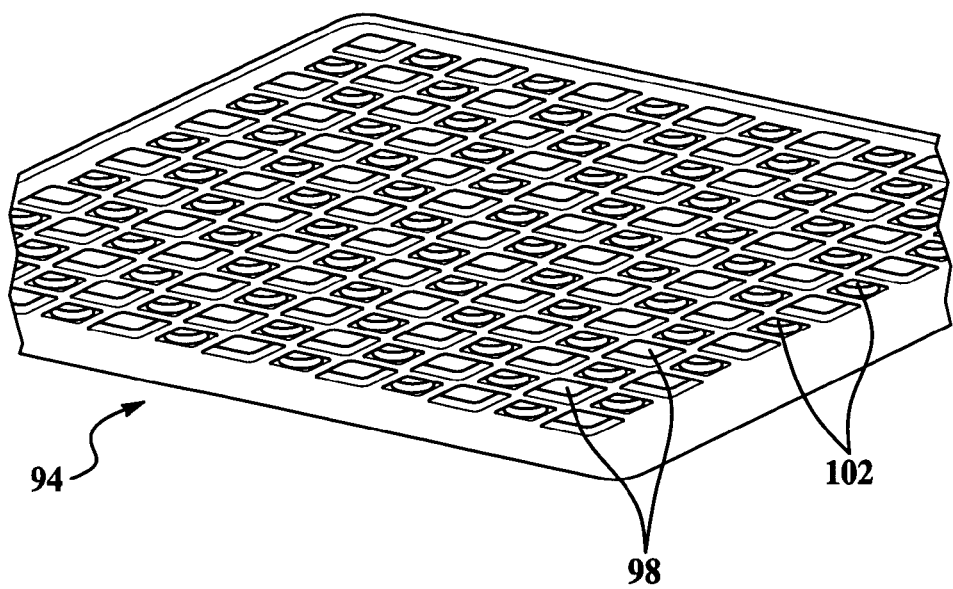
FIG. 8 is a semi-schematic, cutaway, bottom perspective view of the embodiment of a glass seal adapted for operative engagement with the output manifold of FIG. 7.

The non-limitative embodiment of FIG. 8 illustrates different shapes for the first apertures 98 and the second apertures 102. As such, the aperture 98, 102 shapes may be adapted to substantially reduce or substantially eliminate the risk of misalignment of the glass seal 94 with the monolithic body 14 and/or the second manifold 66. It is to be understood that the shape of the ports 86, 90 shown in FIG. 7 may be adapted to substantially align with the apertures 98, 102, respectively.

As a non-limiting example, in the embodiment shown in FIGS. 7 and 8, the output manifold 66 has a substantially square boss forming contact surfaces 72 at each first port 86 adapted for alignment and engagement with the first apertures 98. Each of the first apertures 98 has a substantially tapered square shape adapted for receiving the square boss of the first port 86. The alignment of the ports 86 and apertures 98 aligns the oxygen or fluid collection areas 54, 56 with the first channels 18. Furthermore, the output manifold 66 has a substantially round, flat opening for each second port 90 adapted for alignment and engagement with the second apertures 102, which may have a shape that tapers from a square on the side adjacent to the monolithic body 14 to a circle on the side adjacent to the output manifold 66. The second apertures 102 may be adapted to align with the second ports 90, thereby aligning the second channels 22 with the other of the fluid or oxygen collection areas 56, 54. It is to be understood that the glass seal 94 is adapted to prevent electrical contact between the second ports 90 and the monolithic body 14, and to substantially seal, from each other, adjacent openings 59, 60 of respective channels 18, 22.

In the embodiments disclosed herein, it is to be understood that a decreasing channel 18, 22 size (e.g., diameter, width, etc.) may be associated with an increased active surface area and, thus, increased substantially pure oxygen output. Embodiments of input manifold 62, output manifold 66, and glass seal 94 discussed herein may be efficiently scaled to accommodate channels 18, 22 of various sizes. As such, the oxygen generator 10 may be adapted to provide a higher channel per square inch design than other oxygen generators. In a non-limitative example embodiment, a monolithic body 14 is about 10 inches long, and increased active surface area may be achieved by increasing the number of channels 18, 22 per square inch when viewed from the top of the generator 10. A monolithic body 14 with two channels 18, 22 per square inch has about 60 in$^2$ of active surface area, while a monolithic body 14 with 16 channels per square inch has about 160 in$^2$ of active surface area. The difference in active surface area of these examples is about 167%, even though they have the same square inch footprint on the top. In embodiment(s) of the oxygen generator 10 disclosed herein, it is to be understood that a relatively high density of cells (i.e. channels 18, 22, each of which attaches to a respective port 86, 90 (as shown in FIG. 7)) per the cross sectional area of the monolithic body 14 is advantageously achievable, if desired.

As such, oxygen generator 10 according to embodiment(s) disclosed herein may have from about 50 to about 300 or more cells (e.g., from about 25 to about 150 of channels 18 and from about 25 to about 150 of channels 22) over a representative cross sectional area of the monolithic body 14 of about 6.45 cm$^2$ (1 in$^2$) (i.e., monolithic body 14 includes about 50 to about 300 or more cells per square inch in cross section).

In an embodiment, oxygen generator 10 has 500 or more cells (e.g., at least 250 of channels 18 and at least 250 of channels 22) over a cross sectional area of the monolithic body 14 ranging from about 10.7 cm$^2$ (1.66 in$^2$) to about 64.5 cm$^2$ (10 in$^2$). In sharp contrast, previously known oxygen generators generally had a maximum of 50 cells over a similarly sized cross sectional area of the oxygen generator.

Such an increase (from previously known oxygen generators) in active surface area for a given volume greatly increases the output of a similarly sized oxygen generator (as mentioned immediately above). Without being bound to any theory, it is believed that at least a contributing factor to this increase in active surface area are embodiment(s) of the unique output manifold 66 that is easily machinable, and may be used to efficiently engage with the relatively small channels 18, 22 as disclosed herein.

Although equal numbers of channels 18 and channels 22 were recited above with regard to the numbers of cells per cross sectional area of monolithic body 14, it is to be understood that, in alternate embodiment(s) of generator 10 as disclosed herein, it is not necessary for the number of channels 18 to equal the number of channels 22. It is to be further understood that the examples of cross sectional areas given above are not meant to be limiting in any way, but rather are set forth as examples to correlate with the stated ranges of cells per cross sectional areas. As such, cross sectional areas of monolithic body 14 of any desired size(s) are contemplated as being within the purview of the present disclosure.

It is to be understood that the terms "top," "bottom," "side" and/or like terms are not intended to be limited to, nor necessarily meant to convey a spatial orientation, but rather are used for illustrative purposes to differentiate views of the oxygen generator 10, manifold(s) 62, 66, etc. It is to be further understood that embodiment(s) of the present disclosure may be used in any suitable/desirable spatial orientation.

It is also to be understood that the terms "engaged/engage/engaging," "connected/connects/connecting to," and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "engaged with" or "connected/ing to" the other component is somehow in operative communication with the other component (notwithstanding the presence of one or more additional components therebetween). For example, the input manifold 62 may be connected to the output manifold 66 although the monolithic body 14 is disposed therebetween.

While several embodiments have been described in detail, it will be apparent to those skilled in the art that the disclosed embodiments may be modified. Therefore, the foregoing description is to be considered exemplary rather than limiting.

What is claimed is:
1. An oxygen generator, comprising:
a monolithic body;
a plurality of first channels extending longitudinally in the monolithic body, each of the plurality of first channels having an electrode operatively disposed therein, and adapted to have one of fluid or oxygen flowing therethrough;
a plurality of second channels formed in the monolithic body, each of the plurality of second channels being electrically isolated from, yet adjacent to at least a first one of the plurality of first channels in a first direction and a second one of the plurality of second channels in a second direction that is angularly offset from the first direction, thereby forming an alternating configuration of the first channels and the second channels in both the first direction and the second direction, each of the plurality of second channels having a counter-electrode operatively disposed therein, and adapted to have the other of oxygen or fluid flowing therethrough; and an output manifold operatively engaged with the monolithic body, the output manifold having an oxygen collection area separated from a fluid collection area, the oxygen collection area configured to receive substantially pure oxygen from one of the plurality of second channels or the plurality of first channels, and the fluid collection area configured to receive fluid from an other of the plurality of first channels or the plurality of second channels.

2. The oxygen generator of claim 1, further comprising an electrolyte material layer operatively disposed substantially between the electrode and the counter-electrode, wherein the electrode is at least one of a cathode material layer or a conductive material layer, and the counter-electrode is at least one of an anode material layer or a conductive material layer, and wherein the monolithic body is formed from the anode material, the cathode material or the electrolyte material.

3. The oxygen generator of claim 2 wherein the anode material layer is selected from Ni—YSZ, Ni—Al$_2$O$_3$, Ni—TiO$_2$, CuO—YSZ, and combinations thereof, and wherein the cathode material layer is selected from (LaSr)FeCo, LaMnO$_3$, LaSrCoO$_{3-x}$, GdCoO$_{3-x}$, SmSrCoO$_{3-x}$, and combinations thereof.

4. The oxygen generator of claim 2, further comprising:
an input manifold operatively engaged with the monolithic body and adapted to direct fluid through the plurality of first channels or the plurality of second channels;
wherein the output manifold is configured to collect current from one of the electrodes or the counter-electrodes, and the input manifold is configured to deliver current to an other of the counter-electrodes or the electrodes.

5. The oxygen generator of claim 2, further comprising an interlayer disposed substantially between the electrolyte material layer and the electrode.

6. The oxygen generator of claim 1, further comprising an input manifold operatively engaged with the monolithic body and adapted to direct fluid through the plurality of first channels or the plurality of second channels.

7. The oxygen generator of claim 6 wherein the input manifold is configured to provide a substantially uninterrupted fluid flow along a length of the plurality of first channels or the plurality of second channels.

8. The oxygen generator of claim 6, further comprising at least 250 of the second channels and at least 250 of the first channels, and wherein the output manifold is configured to sealingly engage with each of the at least 250 second channels and with each of the at least 250 first channels.

9. The oxygen generator of claim 1 wherein the monolithic body is formed from an electrolyte material, wherein the electrode and the counter-electrode are formed of a conductive material layer selected from silver, palladium, platinum, ferritic stainless steel, and combinations thereof, and wherein at least one of the electrode conductive material layer or the counter-electrode conductive material layer is catalytic.

10. The oxygen generator of claim 1, further comprising at least one oxygen collection channel disposed in the output manifold and adapted to be in fluid communication with the oxygen collection area, and at least one exhaust collection channel disposed in the output manifold and adapted to be in fluid communication with the fluid collection area.

11. The oxygen generator of claim 10 wherein the output manifold includes a plurality of the oxygen collection areas in fluid communication with the at least one oxygen collection channel and a plurality of the fluid collection areas in fluid communication with the at least one exhaust collection channel, each of the areas extending substantially parallel to each other throughout the output manifold, wherein each of the plurality of the oxygen collection areas is configured to receive substantially pure oxygen from some of the plurality of second channels or the plurality of first channels, and wherein each of the plurality of the fluid collection areas is configured to receive fluid from some of the other of the plurality of first channels or the plurality of second channels.

12. The oxygen generator of claim 1, further comprising a seal formed from a material selected from glass, glass-ceramic oxide composites, glass fibers, and combinations thereof, the seal configured to electrically isolate the output manifold from the electrode or the counter-electrode, and configured to substantially seal from each other adjacent openings of the first and second channels.

13. The oxygen generator of claim 2 wherein the electrolyte material layer includes at least one of yttria stabilized zirconia, gadolinia-doped ceria, samaria-doped ceria, scandia-doped zirconia, ytterbia-doped zirconia, samarium oxide-doped ceria, gadolinium oxide-doped ceria, or combinations thereof.

14. The oxygen generator of claim 1 wherein one of the electrode or the counter-electrode extends substantially a length of the monolithic body, and an other of the counter-electrode and electrode extends substantially shorter than the length of the monolithic body.

15. The oxygen generator of claim 1 wherein each of the first and second channels is formed of at least three longitudinally extending walls, and wherein at least one of the walls is shared by an adjacent respective first or second channel.

16. The oxygen generator of claim 1 wherein each of the first channels is formed from two pairs of contiguous longitudinally extending opposed walls, one of the pairs of opposed walls being angularly offset from the other of the pairs of opposed walls; and wherein each of the second channels is formed from two pairs of longitudinally extending opposed walls, one of the pairs of opposed walls being angularly offset from the other of the pairs of opposed walls.

17. The oxygen generator of claim 1 wherein at least one of the plurality of electrode channels or the plurality of counter-electrode channels has a predetermined cross-sectional shape.

18. The oxygen generator of claim 1 wherein no two channels of the plurality of first channels are directly adjacent one another and no two channels of the plurality of second channels are directly adjacent one another.

19. An oxygen generator, comprising:
a monolithic body;
a plurality of first channels extending longitudinally in the monolithic body, each of the plurality of first channels having an electrode operatively disposed therein, and adapted to have one of fluid or oxygen flowing therethrough;
a plurality of second channels formed in the monolithic body, each of the plurality of second channels being electrically isolated from, yet adjacent to at least one of the plurality of first channels, thereby forming an alternating configuration of the first channels and the second channels, each of the plurality of second channels having a counter-electrode operatively disposed therein, and adapted to have the other of oxygen or fluid flowing therethrough;
an output manifold operatively engaged with the monolithic body, the output manifold having an oxygen collection area separated from a fluid collection area, the oxygen collection area configured to receive substantially pure oxygen from one of the plurality of second channels or the plurality of first channels, and the fluid collection area configured to receive fluid from an other of the plurality of first channels or the plurality of second channels;

at least one oxygen collection channel disposed in the output manifold and adapted to be in fluid communication with the oxygen collection area, and at least one exhaust collection channel disposed in the output manifold and adapted to be in fluid communication with the fluid collection area;

wherein the output manifold includes a plurality of the oxygen collection areas in fluid communication with the at least one oxygen collection channel and a plurality of the fluid collection areas in fluid communication with the at least one exhaust collection channel, each of the areas extending substantially parallel to each other throughout the output manifold, wherein each of the plurality of the oxygen collection areas is configured to receive substantially pure oxygen from some of the plurality of second channels or the plurality of first channels, and wherein each of the plurality of the fluid collection areas is configured to receive fluid from some of the other of the plurality of first channels or the plurality of second channels; and wherein the output manifold includes a substantially serpentine wall alternately forming the plurality of the oxygen collection areas and the plurality of the fluid collection areas between adjacent wall sections thereof, each of the plurality of the oxygen collection areas and the plurality of the fluid collection areas extending substantially angularly offset with respect to one of the respective at least one oxygen collection channel and at least one exhaust collection channel, wherein each of the plurality of the oxygen collection areas has a flow path of a first direction, each of the plurality of fluid collection areas has a flow path of a second direction, and wherein the first direction is substantially the same as, or substantially opposite from the second direction.

20. An oxygen generator, comprising:

a monolithic body;

a plurality of first channels extending longitudinally in the monolithic body, each of the plurality of first channels having an electrode operatively disposed therein, and adapted to have one of fluid or oxygen flowing therethrough;

a plurality of second channels formed in the monolithic body, each of the plurality of second channels being electrically isolated from, yet adjacent to at least one of the plurality of first channels, thereby forming an alternating configuration of the first channels and the second channels, each of the plurality of second channels having a counter-electrode operatively disposed therein, and adapted to have the other of oxygen or fluid flowing therethrough;

an output manifold operatively engaged with the monolithic body, the output manifold having an oxygen collection area separated from a fluid collection area, the oxygen collection area configured to receive substantially pure oxygen from one of the plurality of second channels or the plurality of first channels, and the fluid collection area configured to receive fluid from an other of the plurality of first channels or the plurality of second channels;

at least one oxygen collection channel disposed in the output manifold and adapted to be in fluid communication with the oxygen collection area, and at least one exhaust collection channel disposed in the output manifold and adapted to be in fluid communication with the fluid collection area, wherein at least one of the oxygen collection channel or the exhaust collection channel increases in cross-sectional area in a direction of substantial fluid flow within the at least one of the oxygen collection channel or the exhaust collection channel.

* * * * *